May 6, 1952 — M. DEN HERTOG ET AL — 2,595,378
SELECTIVE SYSTEM
Filed June 12, 1950 — 4 Sheets-Sheet 1
FIG. 1.
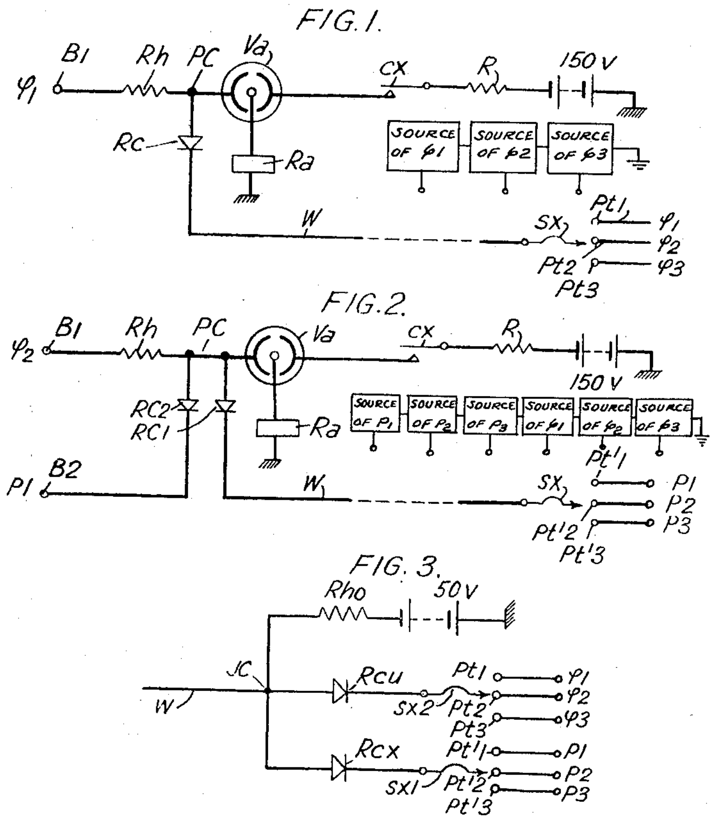
FIG. 2. FIG. 3.
FIG. 4.
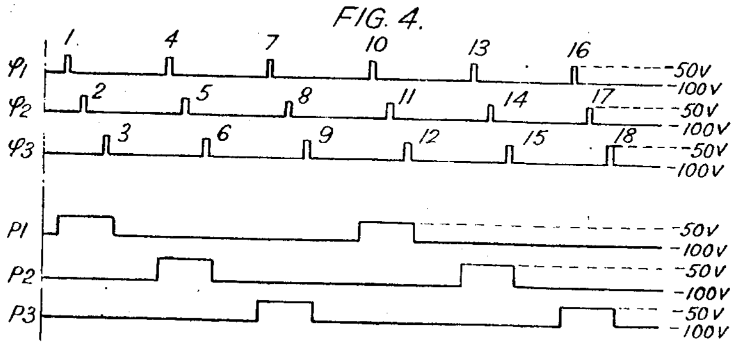
Inventors
MARTINUS DEN HERTOG
HANS H. ADELAAR
By Robert Harding Jr.
Attorney Inventors
MARTINUS DEN HERTOG
HANS H. ADELAAR
By Robert Harding Jr.
Attorney

SELECTIVE SYSTEM

Filed June 12, 1950 4 Sheets-Sheet 3

Inventors
MARTINUS DEN HERTOG
HANS H. ADELAAR
By Robert Harding Jr.
Attorney

SELECTIVE SYSTEM

Filed June 12, 1950

Inventors
MARTINUS DEN HERTOG
HANS H. ADELAAR
By Robert Harding Jr.
Attorney

Patented May 6, 1952

2,595,378

UNITED STATES PATENT OFFICE 2,595,378

SELECTIVE SYSTEM

Martinus Den Hertog and Hans Helmut Adelaar, Antwerp, Belgium, assignors to International Standard Electric Corporation, New York, N. Y., a corporation of Delaware Application June 12, 1950, Serial No. 167,674
In France May 23, 1949

18 Claims. (Cl. 177—353)

The present invention relates to a system of control of the electrical conditions of different electrical circuits in order to effect signalling or control dependent upon the said conditions and to a selection system for electrical circuits or equipments making it possible to carry out simple or complicated selection in an extremely short time.

One of the objects of the invention is to provide a system of this kind which is inexpensive but reliable and quick in operation and can be used both for simple and complex requirements.

Another object of the invention is to make it possible by simple means to control the potential applied to an electrode of a thermionic or gas discharge device by different circuits connected to said electrode.

One of the characteristics of the invention is the provision of an arrangement of circuits to control the potential received on an outgoing signalling or control circuit by the value of the potentials respectively applied to different circuits connected in parallel to said signalling or control circuit, one through a resistance and the other or others each through a uni-directional current carrying device.

Another characteristic of the invention consists of a signalling circuit and various local circuits associated therewith. A resistance is inserted in one of said circuits and a rectifier in each of the others, a potential V1 being applied via the resistance, and a potential V2 via the rectifiers. Means is provided to substitute the potential V1 for the potential V2 through all or part of the rectifiers by a source of potential impulses equally spaced and of predetermined frequency, the potentials V1 and V2 having such values that the derived potential applied to the signalling outlet has the value V2 when the potential V2 is applied at least to one uni-directional current carrying device, while the potential of the signalling outlet is equal to V1 when said potential V1 is simultaneously applied to the resistance and all the uni-directional current carrying devices.

Another characteristic of the invention consists in a combination of circuits for controlling the potential applied to a common circuit to which they are connected in parallel, one of said controlling circuits comprising a resistance in series and each of the others a uni-directional current carrying device in series. Means is provided to apply a potential V1 to the resistance and, normally, a potential V2 to each of the uni-directional current carrying devices and in order to substitute a potential V1 for the potential V2, the potential V1 is applied to the uni-directional current carrying devices in the form of series of impulses equally spaced and of a predetermined frequency which is peculiar to each of the uni-directional current carrying devices and may be different for all or a part of said devices, the values of the potentials V1 and V2 being so chosen that the derived potential applied to the outlet is equal to V2 when said potential V2 is applied at least to one uni-directional current carrying device while the potential of the outlet is equal to V1 when said potential V1 is simultaneously applied to the resistance and to all the uni-directional current carrying devices.

Another characteristic of the invention consists in a combination of circuits all connected to an electrode of a thermionic or gas discharge device comprising several electrodes for controlling the electrical potential applied to said electrode, and means for applying either an effective potential or an ineffective potential to each of the circuits, the discharge device being operable only if the same effective potential is simultaneously applied to all the circuits, a resistance being insertable in one of said circuits and a uni-directional current carrying device in each of the others.

Another characteristic of the invention consists of a method of signalling or control in which groups of lines or equipments are each characterized by long impulses situated in different time units for each group of lines or equipments, and the lines or equipments in each group are characterized by short impulses situated in different time units for each of the lines or equipments, said short impulses being common to the lines or equipments of the various groupings and the duration of the long impulses being such that they correspond at least to one complete cycle of short successive impulses characterizing the different lines or equipments.

Another feature of the invention consists of a selection system in which impulses of electrical energy at specific moments in accordance with a first periodic cycle are employed with electrical power impulses emitted at specific moments in accordance with a second periodic cycle each of the impulses of the second cycle having a duration which, including the interval between impulses, if any, is at least equal to one series of impulses of the first cycle, means being provided to render effective the impulses of the first cycle situated in specific time units only if a corresponding impulse of the second cycle is received at the same time.

Another characteristic of the invention consists in the fact of employing as impulse sources electrical conditions of the generators which produce the potential impulses.

Another characteristic of the invention consists of a selection system comprising a comparator composed of the combination of a certain number of devices for comparison of electrical conditions.

Another characteristic of the invention consists of a comparator for a system of selection by impulses composed of a certain number of groups and sub-groups of comparison devices for electrical conditions or electrical switches, the number of groups being equal to the number of series of impulses of the slowest cycle, the number of sub-groups in each group to the number of series of impulses of a quicker cycle and the number of devices for comparison of electrical conditions in each sub-group being equal to the number of series of impulses of the quickest cycle, each of said devices corresponding to one time impulse.

Another characteristic of the invention consists of means for effecting a selection among $m+n+o$ . . . possible electrical conditions ($m$, $n$, $o$ . . . possibly being equal) comprising groups of electrical switching devices, each of said groups having respectively $m$, $n$, $o$ . . . switching devices all of which are connected in parallel to a control wire, means being provided for applying one of the $m+n+o$ . . . electrical conditions to said wire and the electrical switching devices being so arranged that each of said signals can only cause the operation of a single device among all the devices of the assembly of groups.

Another characteristic of the invention consists in providing arrangements effective when one of the comparison devices has operated to render the other devices inoperative.

Another characteristic of the invention consists in a selection system among $m \times n \times o$ . . . possible electrical conditions ($m$, $n$, $o$ . . . being equal) comprising a selector comparator composed of $y$ groups of electrical switching devices each of the groups having respectively $m$, $n$, $o$ . . . electrical switching devices, all the said devices being connected in parallel to a common wire to which can be applied by suitable means one of the $m \times n \times o$ possible electrical conditions, the different groups of electrical switching devices being provided in order that each of the signals received may cause the operation of a single device in each group, the combination of the different devices which operate characterizing the selection signal received in the comparator.

Another characteristic of the invention consists in a selection system in which cycles of time potential impulses are employed, the different impulses characterizing lines or equipments or groups of lines or equipments, the frequencies of the different cycles being different, and each of the impulses of a particular cycle being applied to a circuit peculiar to each of the switching devices of a particular group of switching devices of a comparator, means being provided to send on the selection control wire of the comparator, common to the assembly of switching devices, a signal obtained by the combination of an impulse of each of the cycles, the reception of said signal causing the operation of a particular switching device in each of the groups.

Various other characteristics will appear from the following description given as a non-limitative example referring to the attached drawings in which:

Fig. 1 shows an embodiment in accordance with the invention of a signalling or control system comprising a cold cathode tube with two control circuits.

Fig. 2 shows another embodiment of a signalling or control circuit comprising three control circuits of the tube.

Fig. 3 shows a circuit arrangement for obtaining an electrical condition on a main control wire which depends upon the electrical condition of two secondary control circuits.

Fig. 4 shows the curves of the various series of impulses employed in the arrangements of Figs. 1–3.

Figure 6:
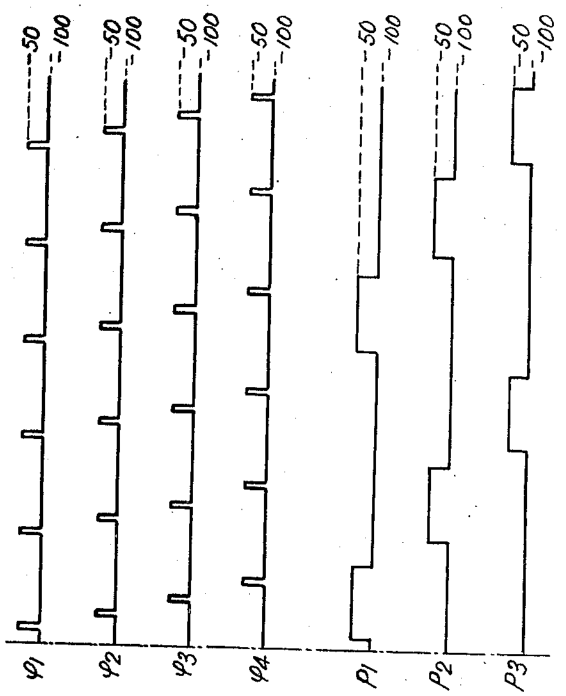
Fig. 6 shows the curve of the various series of impulses employed in the systems of Figs. 5, 7, and 8.

The receiving device of Fig. 1 comprises a cold cathode discharge tube V*a* having an anode (shown at the center), a cathode (shown at the right) and a control electrode (shown at the left). There is inserted in the anode circuit a relay R*a* provided with the necessary contacts (not shown) in order to carry out the controls or signals. The control electrode is connected to one of the various sources of potential producing impulses situated in time. Three of these series of impulses $\varphi 1$, $\varphi 2$, $\varphi 3$, are shown in Fig. 4.

It will be assumed that source $\varphi 1$ is connelted via the resistance R*h* to the control electrode, which is also connected via the uni-directional current carrying device or dry rectifier R*c* to the wire W on which the control signal is received. Said control signal is sent on the wire W by connecting this wire to one of the contacts P*t*1 to P*t*3, connected to the various impulse sources $\varphi 1$, $\varphi 2$, $\varphi 3$, via the mobile or wiper contact *sx*.

A ground potential is applied to the anode of the tube V*a* via the signalling relay R*a* and a predetermined potential, which may, for example, be −150 v., is connected to its cathode via a resistance R and a make contact *cx* the closing of which places the device in the operative condition.

Referring to Fig. 4, it will be seen that each of the sources $\varphi 1$, $\varphi 2$, and $\varphi 3$ gives a series of equally spaced impulses, 1, 4, 7, 10, 13, 16, 2, 5, 8, 11, 14, 17 and 3, 6, 9, 12, 15 and 18. These various series of impulses are out of phase with each other. The impulses successively supplied by the various sources $\varphi 1$, $\varphi 2$ and $\varphi 3$ are repeated indefinitely in accordance with a predetermined cycle; in the example shown a certain number of impulse cycles have been illustrated, 1 to 3, 4 to 6, 7 to 9, 10 to 12, 13 to 15 and 16 to 18.

The control electrode is, for the greater portion of one impulse cycle, connected to a predetermined potential which has been assumed to be equal to −100 v. Under these conditions the potential applied to the ionization gap of the tube V*a*, which is equal to the difference of potential between the cathode and the control electrode is only 50 v.; this difference of potential is not sufficient to cause the ionization of the tube.

When the potential is changed to —50 v. by the impulses the difference of potential of 100 v. between the control electrode and the cathode is sufficient to cause the ionization of the tube if the contact *cx* is closed.

For the tube V*a* the potentials of —100 v. received on its control electrode are control potentials which do not cause it to operate, or ineffective potentials, while the potentials of —50 v. are potentials causing its operation, or effective potentials.

We will now explain the operation of the device. It will be assumed that the signal wire W is connected by means of moving contact *sx* to the source of potential φ2, as shown in Fig. 1, the contact *cx* being closed in order to apply the potential —150 v. to the cathode of the tube V*a* via resistance R. It will moreover, be assumed that immediately after the closing of contact *cx*, a —50 v. impulse is sent by the source φ1 on the terminal B1. The control electrode of the tube V*a* is connected via the rectifier R*c* to the signal wire W. At the moment in which the source φ1 produces a peak of potential at —50 v., the sources φ2 and φ3 give a potential of —100 v. As the potential of the common point PC is in this case at a higher value than that of the wire W, the rectifier R*c* will be conductive and current will flow from the terminal B1 to the contact P*t*2 and to the generator φ2 through: the resistance R*h*, common point PC, rectifier R*c*, wire W, contact *sx*, contact P*t*2 and generator φ2. The result is a drop of potential in the resistance R*h* and, by a suitable choice of the value of this resistance, taking into account the other elements of the circuit, it is possible to obtain on the point PC a value of potential which is not sufficient to cause the ionization of the tube V*a*. It will be assumed that the value of the potential on the point PC is maintained at —100 v. It will be seen that, under these conditions, the fact of simultaneously connecting the terminal B1 to the source φ1 and the wire W to the source φ2 does not cause the tubes V*a* to fire and consequently the signalling device will not operate and relay R*a* will not be actuated.

It will now be assumed that the source of potential φ2 is sending a potential peak of —50 v. The terminal B1 connected to the source φ1 receives at the same moment a potential of —100 v. which is sent via resistance R*h*, to the control electrode of V*a*. The potential of the wire W being, in this case, higher than that of the point PC, the rectifier R*c* is not conductive. No current will thus flow in the resistance R*h* and the potential of —100 v. applied to the control electrode of V*a* cannot cause it to fire.

In the case in which the contact *sx* is placed on the contact P*t*1 connected to the source of potential φ1, the contact *cx* being closed, if a peak of potential or impulse of —50 v. is sent by the source φ1, this potential is simultaneously received at B1 and on the wire W. Owing to the fact that the wire W and the point PC are at the same potential, no current will flow in the rectifier R*c* and the resistance R*h*. The —50 v. potential will thus be applied to the electrode of the tube V*a* and will cause it to fire. The circuit of relay R*a* is then completed through the anode of the tube V*a*, the cathode, the contact *cx* closed, the resistance R, the —150 v. battery, and earth. The signalling device has thus been actuated.

It will be seen that the operation of the tube and consequently of the signalling device can only be effected when the circuit comprising the resistance and the circuit comprising the rectifier receive simultaneously potentials which produce a potential impulse having a value at least equal to the effective potential which causes the ionization of the tube.

After the end of the reception of the impulse the tube is maintained fired on the circuit of relay R*a* previously indicated, until the contact *cx* is opened.

In the above description it has been assumed that a single source of impulses was connected, via a rectifier, to the control electrode of the tube V*a*. Nevertheless any number of impulse sources may be connected to the control electrode without interfering with each other, provided only that one of said sources is connected through a resistance, and each of the others through its individual rectifier. The particular source connected through the resistance acts as a source supplying the ionization current of the discharge gap; all the other sources which are connected to the same electrode through rectifiers never supply current for the operation of the tube, but simply absorb with that which is supplied by the source connected through the resistance and this during the time in which the potential of the latter is effective and that of the others ineffective.

Of course it would also be possible, without departing from the scope of the invention, to modify the device of Fig. 1 by transposing the position of resistance R*h* and of rectifier R*c*; that is to say by arranging the resistance in series on the wire W and the rectifier between the terminal B1 and the common point PC. In this case the source of current connected through the wire W and the wiper *sx* would act as a source supplying the ionization current of the tube, while the source of current connected to B1 would absorb the current of the source connected to W during the period in which the potential of W was higher than that of the point PC.

In order to prevent inopportune operation of the tube V*a* it is necessary always to insert the rectifier R*c* in that one of the control circuits in which there can be no breaking of the circuit from the moment in which the contact *cx* has been closed.

It will be assumed that the signalling or control to be effected depends upon the electrical conditions of three control wires. In this case the device of Fig. 2 will be employed and the two groups of impulses shown in Fig. 4.

In the example shown, it has been assumed that the group of short impulses φ comprises three different sources only, it being of course understood that this number is not limitative; the group of long impulses P has also been assumed to comprise three different sources. The duration of the long impulses P and their position in time are chosen so that each of said impulses may be transmitted during a cycle corresponding to three short predetermined impulses 1, 2 and 3. In the example of Fig. 2 it will be seen that the first long impulse P1 will be transmitted during the period of emission of the impulses 1, 2 and 3 of the cycle φ1 to φ3 and the second impulse P1 during the period of emission of the impulses 10, 11 and 12 of the cycle φ1 to φ3. Similarly the impulses P2 correspond to short impulses 4, 5, 6 and 13, 14 and 15 and the impulses P3 to the short impulses 7, 8, 9 and 16, 17 and 18. Moreover, the position in time of the various impulses P1 to P3 is such that, in a particular time unit embracing one cycle of the short impulses only one of said long impulses is transmitted. It is obvious that the length of the impulses P depends on the number of short impulses φ; generally speaking, each of the impulses P corresponds to the transmission of a complete cycle situated in time of impulses φ.

It has been assumed, as an example, that the potential of the sources was −100 v. when the impulses were not transmitted and −50 v. during the transmission of the impulses.

One of the sources of long impulses, which has been assumed to be the source P1, is connected to the terminal B2 of Fig. 2, said terminal being connected to the control electrode of the tube V*a* through the rectifier R*c*2. One of the sources of short impulses which has been assumed to be φ2, is connected to the control electrode of V*a* via resistance R*h*; it will be noted that the resistance R*h* is arranged between the terminal B1 and the junction point PC of the connection of the terminal B2.

The arrangement which has just been indicated for the circuit B1, R*h*, PC, R*c*2, B2, makes it possible to obtain the transmission of an effective potential on the control electrode of V*a*, all other considerations set aside, only when a potential impulse is simultaneously received on the terminals B1 and B2. In effect, if a potential impulse of −50 v. is sent to the terminal B1, and a potential of −100 v. to the terminal B2, the point PC being more positive than the terminal B2, the rectifier R*c*2 is conductive and current will flow from B1 and B2 causing a drop of potential in the resistance R*h* which lowers the potential of the point PC to such a value that the tube V*a* cannot be fired. If a potential of −100 v. is applied to the terminal B1 and an impulse of −50 v. potential to the terminal B2, said terminal B2 is more positive than the point PC and the rectifier R*c*2 is not conductive; the potential of −100 v., which cannot cause the ionization, is applied to the control electrode of V*a*. If a potential impulse of −50 v. is simultaneously transmitted to the terminals B1 and B2 there is no current flow in the rectifier R*c*2 and said potential applied to the control electrode causes the tube V*a* to fire.

The signalling wire W is connected at one of its ends to the control electrode of V*a* through rectifier R*c*1; the other end of the wire W may be connected through the switch *sx* to one of the sources P1, P2 or P3. It will be assumed that the wire W has been connected to the source P2. As previously explained, the −50 v. potential can only be obtained on the point PC if a −50 v. impulse is simultaneously received on the terminals B1 and B2 of the sources φ2 and P1. Referring to Fig. 4 it will be seen that when the source P1 transmits an impulse of −50 v. the source P2 is at the potential of −100 v. Under these conditions the potential of the wire W will be lower than that of the point PC; in this case the rectifier R*c*1 is conductive and current will flow from the source φ2 to the source P2 causing a drop of potential in the resistance R*h* which lowers the potential of the point PC to a value which cannot cause the firing of the tube V*a*. The signalling device thus will not operate.

It will now be assumed that the switch *sx* has been placed on the terminal of the source P1. A potential of −50 v. will in this case be simultaneously applied to the terminals B1 and B2 and to the wire W, upon the reception of an impulse φ2 and P1 and the tube V*a* will be fired causing the operation of the relay R*a*, the contact *cx* having been closed when the device was put into operation. Similarly it will be seen from Fig. 4 that the device will operate during the reception of a long impulse P1 and short impulses 1 to 3, 10 to 12, etc. . . .

It will now be assumed that the wire W is connected to the circuit of Fig. 3. The signal sent on the wire W will depend in this case on the electrical terminal B1 which is connected to the condition of the secondary circuits on which the switches *sx*1 and *sx*2 are placed. The secondary control circuits are connected to the wire W respectively through the rectifiers R*cu* and R*cx*; the wire W on the other hand is connected to a particular potential which has been assumed to be −50 v., through a resistance R*ho*. Under these conditions the −50 v. potential through R*ho* will only be seen on the wire W if a potential of −50 v. is also applied through the switches *sx*2, and *sx*1. In effect, if a potential of −100 v. is applied to one or both switches *sx*1 and *sx*2, the potential of JC being higher than the potential of *sx*1 or *sx*2, the rectifiers R*cx* or R*cu* are conductive and current will flow through the resistance R*ho* to one or both sources φ and P. The drop of potential occurring in R*ho* gives the point JC of potential of −100 v. and the tube V*a* cannot be fired.

In considering Figs. 2 and 4 and the explanations given it will be seen that the signalling device can only operate if potential impulses are simultaneously received on the terminals B1 and B2 and through the switches *sx*1 and *sx*2. It is thus possible to obtain a signalling or control device dependent upon the electrical conditions of different circuits and practically instantaneous in operation, and to obtain, for example, a particular control impulse situated in time among the 9 impulses of Fig. 3.

Of course, the number of impulse sources φ and P can be different from the three indicated as an example and said impulses might be longer or shorter. The length of the impulses P must be such that each of said impulses is produced during the time of transmission of one complete cycle situated in time of the different impulses φ.

The switch *sx*2 might be connected through a particular signalling wire, with the insertion of a rectifier, directly to the junction point PC. In this case the circuit of the −50 v. battery through the resistance R*ho* would not be necessary for the operation of the device and could be eliminated.

Figure 5:
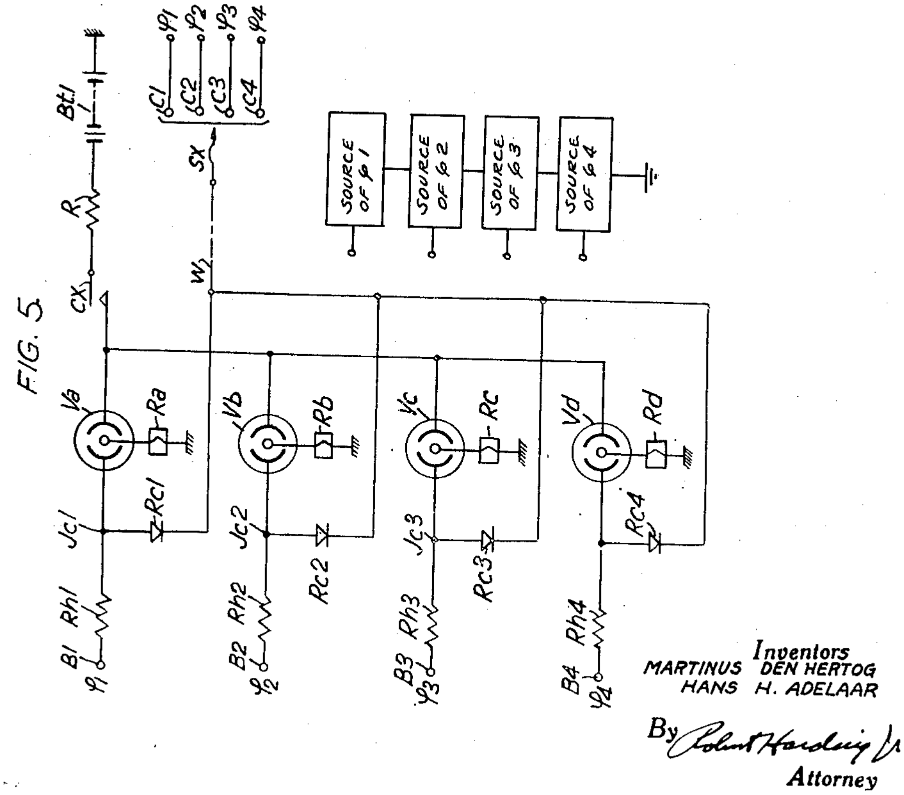
Fig. 5 shows a selection system with a plurality of discharge devices in which the selection is obtained by two control circuits connected to each of the devices for comparison of electrical conditions, as in Fig. 1, and in which there are four series of impulses.
Figure 7:
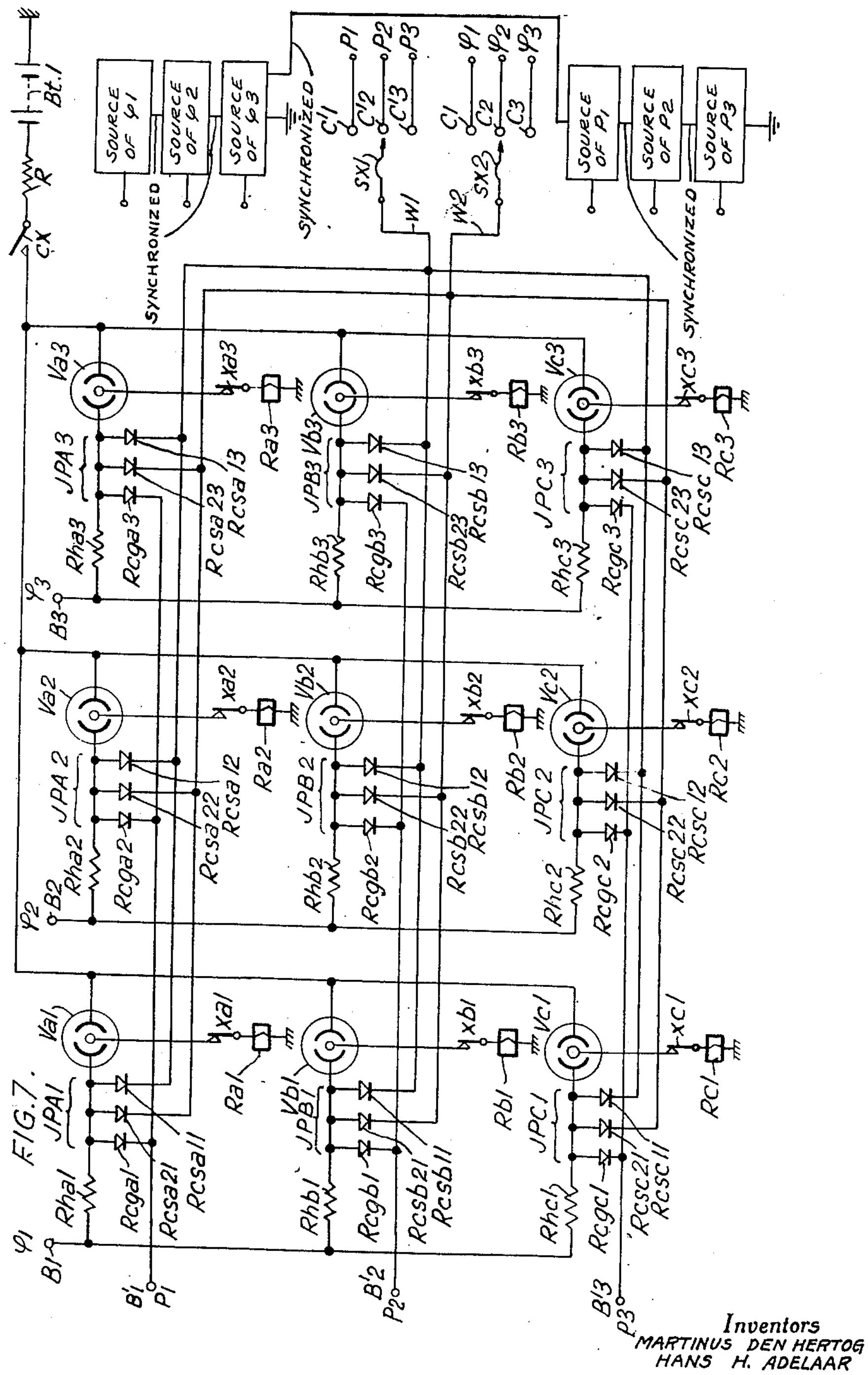
Fig. 7 shows a selection system with still a larger number of discharge devices in which the selection is obtained by three or four control circuits connected to the devices for comparison of electrical conditions.

In the arrangement already described a single discharge device is caused to operate under control of impulses. In Figures 5, 6 and 7 an arrangement for selecting one of a plurality of discharge devices is shown. In Fig. 5 the comparator comprises a certain number of cold cathode discharge tubes similar to those already described. In the example shown there are four tubes, V*a*, V*b*, V*c*, V*d*, the number of these tubes being equal to the number of selections which can be made. The control electrode for each of the tubes is on the left and is connected via a resistance R*h*1 to R*h*4 to a terminal B1 to B4, itself connected to a source of potential impulses φ1 to φ4, situated in time as indicated in the upper part of Fig. 6. Each of the control electrodes of the tubes is moreover, connected via a unidirectional current carrying device, such as a rectifier for example, R*c*1 to R*c*4 to a common wire W on which the selection signal is received. A particular selection signal is sent on the wire W when the mobile switch or the selector *sx* is placed on one of the contacts C1 to C4 each of which is connected to one of the sources $\varphi 1$ to $\varphi 4$.

As described in connection with the tubes of Figs. 1 and 2, each tube V*a* . . . V*d* has its anode connected to ground potential via a relay R*a* . . . R*d*, said relays having the necessary contacts (not shown), to effect the desired operations. The cathodes of the different tubes are connected via contact *cx*, and a common resistance R to the negative pole of a battery B*t*1 of potential V1, which is assumed to be equal to —150 v., of which the positive pole is earthed. When the selection system is put into use the contact *cx* is closed.

Referring to Fig. 6 it will be seen that each cycle contains four impulses instead of the three shown in Fig. 4.

The operation of the system will now be explained. Contact *cx* having been closed, it will be assumed that the mobile contact *sx* is placed on the contact C2 on which the impulses $\varphi 2$ are received. The closing of *cx* has applied to all the cathodes of the tubes V*a* . . . V*d* the potential —150 v., via the common resistance R. It will be assumed that immediately after the closing of contact *cx* an impulse of —50 v. is transmitted by the source $\varphi 1$. This potential impulse, as already explained, if received on the control electrode of V*a*, would give a difference of potential of 100 v. between said control electrode and the cathode which would cause the ionization of the tube. The source $\varphi 2$, however, is, at the moment under consideration —100 v. The result is that the potential of the common point J*c*1 is higher than that of the contact C2 and the rectifier R*c*1 is conductive, causing current to flow from the terminal B1 to the contact C2 via: resistance R*h*1, rectifier R*c*1, wire W, contact *sx* and contact C2. The value of the resistance R*h*1 is chosen similarly to R*h* of Fig. 1 and the drop of potential in said resistance maintains the potential of the point J*c*1 and of the control electrode of V*a* at a potential of —100 v. which cannot cause said tube V*a* to ionize.

The —100 v. potential is sent at the same moment to the terminals B2, B3 and B4 and cannot cause the ionization of the tubes V*b*, V*c*, V*d*.

It will now be assumed that the source $\varphi 2$ is transmitting an impulse at —50 v. The potential of the sources $\varphi 1$, $\varphi 3$ and $\varphi 4$ is at the same moment —100 v. This impulse $\varphi 2$ at —50 v. is received on terminal B2 and at the same time on the contact C2. The common point J*c*2 and the wire W being at the same potential no current will flow in resistance R*h*2, and rectifier R*c*2, and the control electrode of the tube V*b* is brought to the potential of —50 v. which causes the ionization of said tube and the operation of relay R*b* which causes the desired signal or control. After the end of the impulse the tube remains fired, and the relay is held through the ionized space of the tube V*b*, the contact *cx* closed, resistance R, battery B*t*1 and earth.

The tubes V*a*, V*c*, V*d*, cannot be ionized, the potential of the terminals B1, B3 and B4 and consequently that of the common points J*c*1, J*c*3, J*c*4 being —100 v. and that of wire W —50 v., the potential of said common point is lower than that of wire W, and the rectifiers R*c*1, R*c*3, R*c*4, are not conductive. The control electrodes of V*a*, V*c*, V*d*, are thus maintained at the potential of —100 v. which cannot cause their ionization.

From the foregoing it is clear that the only tube of the system which is ionized is that of which the terminal B is connected to the same source of potential as the switch *sx*.

The flow of current in the circuit; earth, relay R*b*, tube V*b*, contact *cx* resistance R, battery B*t*1 and earth causes a drop of potential in the resistance R, which alters the potential of the cathodes of the tubes V*a*, V*c* and V*d* to such a value that they are no longer capable of operating; on the other hand this potential is sufficient to maintain the tube V*b* fired.

The rectifiers R*c*1 . . . R*c*4 have the effect of preventing the effective potential of —50 applied to the wire W from being received on the control electrode of the tubes of which the terminal B received an impulse of potential of —100 v. In this case the potential of the wire W being higher in relation to the common point J*c*, the rectifier R*c* is not conductive and the potential of the control electrode is maintained at the value of —100 v. which cannot cause its ionization. If the rectifiers were not provided, all the control electrodes would be at the same potential as the wire W.

Obviously it would be possible without departing from the scope of the invention to arrange the rectifier in the place of the resistance and vice versa. The resistance R*h* would be inserted in the particular circuit for connection of each control electrode to the common wire W, and the rectifier in the circuit for connection of said control electrode to the terminal B. In this case, the source of current connected to the wire W via switch *sx* could constitute the source of supply providing the ionization current of one of the tubes, while the sources connected to the terminal B would absorb the current via the wire W and the resistance R*h* of the tube concerned, during the time in which the potential of the wire W was effective, and that of the terminal ineffective.

Fig. 7 shows a selection system permitting the selection of a free line or an equipment in a particular group of lines or equipments. This device can, for example, be employed in automatic telephone systems, the outlets being divided into a certain number of groups, each of them comprising several outgoing lines.

In Fig. 7 each outgoing line is represented by a cold cathode tube, such as V*a*1, associated with a relay such as R*a*1; this relay can, for example, control the vertical magnet of a particular outgoing line in a cross bar switch. The horizontal rows of tubes V*a*1, V*a*2, V*a*3—V*b*1, V*b*2, V*b*3—V*c*1, V*c*2, V*c*3 correspond to the different groups. In the example shown it has been assumed that there were three groups of outgoing lines each comprising three outgoing lines but it is obvious that there might be any number of groups and lines in the groups and that in particular there may be 10 groups of 10 outgoing lines.

The various cold cathode tubes of each group are connected to the terminals B1, B2 and B3, which are connected to different sources of potential $\varphi 1$, $\varphi 2$, $\varphi 3$ supplying impulses spaced in time, the position of the impulses in time being different for each of the sources, as indicated in Fig. 6. The three tubes of each of the groups are thus capable of operating in different time units dependent upon the time unit in which the potential impulses are received on the terminals B1 to B3.

As indicated in Fig. 6, it has been assumed as a non-limitative example that when an impulse is transmitted, the potential of sources $\varphi 1$ to $\varphi 3$ is —50 v. and that, when the impulses are not transmitted, the potential of the sources $\varphi 1$ to $\varphi 3$ is —100 v. Moreover, it has been assumed that in order to cause the ionization of the tubes it is necessary to have a difference of potential of 100 v. between the control electrode and the cathode.

The terminals B'1, B'2, B'3 of Fig. 7 are connected to other sources of impulses spaced in time, P1, P2 and P3, each of which is allocated to a particular group of lines. As indicated in Fig. 6, the length of each of the impulses P is at least equal to one complete specific cycle of impulses φ of the different series of impulses including the time intervals which may separate said φ impulses. As for the φ impulses, it has been assumed that the voltage of the sources was —50 v. during the transmission of one impulse and of —100 v. during the interval between the impulses.

For the operation of the device of Fig. 7 the impulses φ1, φ2 and φ3 and the impulses P1, P2 and P3 of Fig. 6 are used. It is obvious that the length of the P impulses increases when the number of φ sources is increased.

The control electrode of the various cold cathode tubes of Fig. 7 is connected to a terminal B through an individual resistance and moreover to a terminal B' through a unidirectional current carrying device such as a rectifier, for example. The impulses at —50 v. received on the terminals B will only be effective if, at the same time a —50 v. impulse is received on the terminals B'. The tube Va1, for example, will only be ionized when the source φ1 is sending a —50 v. impulse on the terminal B1 and at the same time the source P1 is sending a —50 v. impulse on the terminal B'1. In effect, in the case in which a —100 v. potential is sent by the source P1 to the terminal B'1 and a —50 v. potential by the source φ1 on the terminal B1, the rectifier Rcga1 is conductive and current flows from B1 to B'1 through the resistance Rha1 of which the value is such that the drop of potential in said resistance maintains the point JPA1 at the potentials of —100 v. which, taking into consideration the potential of —150 v. of the battery Bt1, cannot cause the ionization of tube Va1.

The control electrodes of the cold cathode tubes are connected via rectifiers individual to each of them, Rcsa11 to Rcsa13, Rcsb11 to Rcsb13, Rcsc11 to Rcs13 to a signalling wire W1. Said signalling wire may be connected by the switch sx1 to one of the contacts C'1 to C'3 to which the sources P1, P2, P3 are respectively connected.

First of all the operation of the device will be described assuming that the signalling wire W2 and the circuits connected therewith do not exist.

It will be assumed that one of the free outgoing lines of the second group of lines is to be selected; the switch sx1 is placed on the contact C'2 and the contact cx is closed in order to apply the —150 v. potential of battery Bt1 through the common resistance R to the cathode of all the tubes. It will, moreover, be assumed that the contact cx is closed at the moment in which a —50 v. impulse is transmitted by the sources φ1 and P1; the source P2 is, at the same moment at the potential —100 v. The potential of the point JPA1 being higher than that of the wire W1, the rectifier Rcsa11 is conductive, and the current flowing between the terminal B1 and the wire W1 maintains the potential of JPA1 at —100 v. The tube Va1 cannot be ionized. Similarly, the —100 v. potential of the wire W1 prevents the ionization of the tubes Va2 and Va3 during the simultaneous reception of the potential impulses P1—φ2 and P1—φ3. When the sources φ1 and P2 are simultaneously sending a —50 v. impulse on the terminal B1, the terminal B'2, and the contact C'2, the control electrode of tube Vb1 is brought to the potential of —50 v., owing to the fact that said potential is simultaneously sent through Rhb1, Rcgb1 and Rcsb11. If the outlet corresponding to the tube Vb1 is free, the contact xb1 is closed and said tube is ionized causing the operation of relay Rb1 and the firing of the tube on the circuit: earth, relay Rb1, contact xb1 closed, anode and cathode of Vb1, contact cx closed, resistance R, battery Bt1 and earth. The flow of current on this circuit maintains the tube fired after the end of the reception of the impulse φ1; moreover, this current flow causes a drop of potential in the resistance R, such that the potential of the cathode of all the other tubes is brought back to a value at which the said tubes are no longer able to operate. Under these conditions it is clear that the device makes it possible to select one only of the free outlets to the exclusion of all the others.

It will now be assumed that the first circuit of the second row corresponding to the tube Vb1 is busy; in this case the contact xb1 is opened and the tube Vb1 is ionized during the reception of the impulse φ1, but as anode-cathode circuit cannot be completed, this ionization terminates with the reception of said impulse, the tube being unable to fire. When the impulse φ2 is received on th terminal B2 if the circuit corresponding to the tube Vb2 is free, said tube operates in a similar manner to that indicated for tube Vb1.

It is clear from the foregoing that the various circuits of a particular group P2 will be successively tested by the transmission on the terminals B1, B2 and B3 of impulses of potential φ, until the moment in which a free circuit is found. The tubes of the other groups cannot operate, because at least one of the circuits connected to their control electrode is receiving a potential of —100 v.

This system in particular may be used in automatic telephone systems for hunting for a free line in a predetermined group of lines in one selection stage.

The purpose of the signalling wire W2 will now be explained. This wire W2 is connected to the control electrode of the various tubes via rectifier Rcsa21 to Rcsa23, Rcsb21 to Rcsb23, Rcsc21 to Rcsc23, each rectifier being individual to an associated tube, and, moreover, to a switch sx2 which may be placed on one of the contacts C1, C2, C3, on which the impulses φ1, φ2 and φ3 respectively are received.

It is then possible, by putting each of the switches sx1 and sx2 on a particular position, to cause the selection of a particular line in a particular group.

It will be assumed, for example, that the switch sx1 has been placed on the contact C'2 (impulses P2) and switch sx2 on the contact C3 (impulses φ3). Under these conditions the operation of tube Vb3 will be caused and consequently, that of the relay Rb3 if the contact xb3 is closed, that is to say, if the line to be selected is free. In effect, when potential of —50 v. is transmitted by the sources P2 and φ3 said potential is received simultaneously on the four circuits connected to the control electrode of tube Vb3. For all the other tubes at least one of said circuits will be at the potential of —100 v. and said tubes cannot be ionized as has already been explained.

This operation of the device, as has just been described, makes it possible in particular to employ it in automatic telephone systems as a final selector.

It is of course possible by only sending potential impulses on the wire W2 and not on the wire W1, to make a selection among the tubes occupying the same position in the various groups.

It will be seen that the set of tubes Va, Vb and Vc forms a comparator making it possible to effect selection, each of the tubes corresponding to a specific selection and that the sources of potentials φ and P with the circuits for connection to the various tubes constitute means for applying to said comparator electrical conditions each of which is situated in time and of which their frequency is different, the tubes constituting means for effecting a selection when different specific electrical conditions are simultaneously applied to the input circuits of the comparator.

Fig. 6 shows that each impulse of the cycle P is at least equal in length to one complete cycle of the different impulses φ, including the intervals separating them.

Relays Ra, Rb, Rc constitute means for registering the position in time of the combination of impulses which causes the operation of the comparator.

It will be noted that connections peculiar to each tube are provided in order to determine the relative position in time of two cycles of impulses for which each of said tubes must be able to operate, and connections in parallel for all the tubes are provided with the two cycles, or one or other of the cycles in order to determine which of the tubes or set of tubes is to operate during selection operation.

If a particular impulse of the cycle P is transmitted to all the tubes, a group of tubes capable of operating will be selected, and the tube of said group which will operate will be one of those of which the individual contact inserted in the anode circuit is closed. This method of selection may be employed in the group selectors of automatic telephone exchanges. If an impulse of the cycle P and an impulse of the cycle φ are simultaneously applied to all the tubes only one of the tubes of the comparator will be able to operate. This method of selection may be employed for the control of final selection in an automatic telephone system when said selection depends, for example, on the number of tens and units.

The opening or closing of the contact provided in each of the anode circuits of the tubes renders the impulses applied to said tubes ineffective or effective, so that if an impulse P is applied to the assembly of the comparator, the condition of the contacts of the anode circuit of the tubes of the group corresponding to said impulse determine those of said tubes among which the selection may be made.

Instead of two signalling wires W1 and W2 in the device of Fig. 7, it is possible to use a single signalling wire. The switches sx1 and sx2 are then connected, as shown in Fig. 3 through the rectifiers Rcu and Rcx to the common signalling wire W. Under these conditions the —50 v. potential will only be sent on the wire W when the switches sx1 and sx2 are placed on the contacts simultaneously receiving a potential of —50 v. In the case in which one of the switches sx1 or sx2 is at the potential —100 v., the rectifier associated with said switch is conductive and current will flow from the battery to the generator connected with said switch; this current flow causes a drop of potential in resistance Rho the value of which is such that the wire W is maintained at the potential —100 v.

Of course it would be possible without departing from the scope of the invention to employ instead of the cold cathode tubes, any device whatsoever capable of operating when a particular potential is applied to the control wire to which it is connected.

Figure 8:
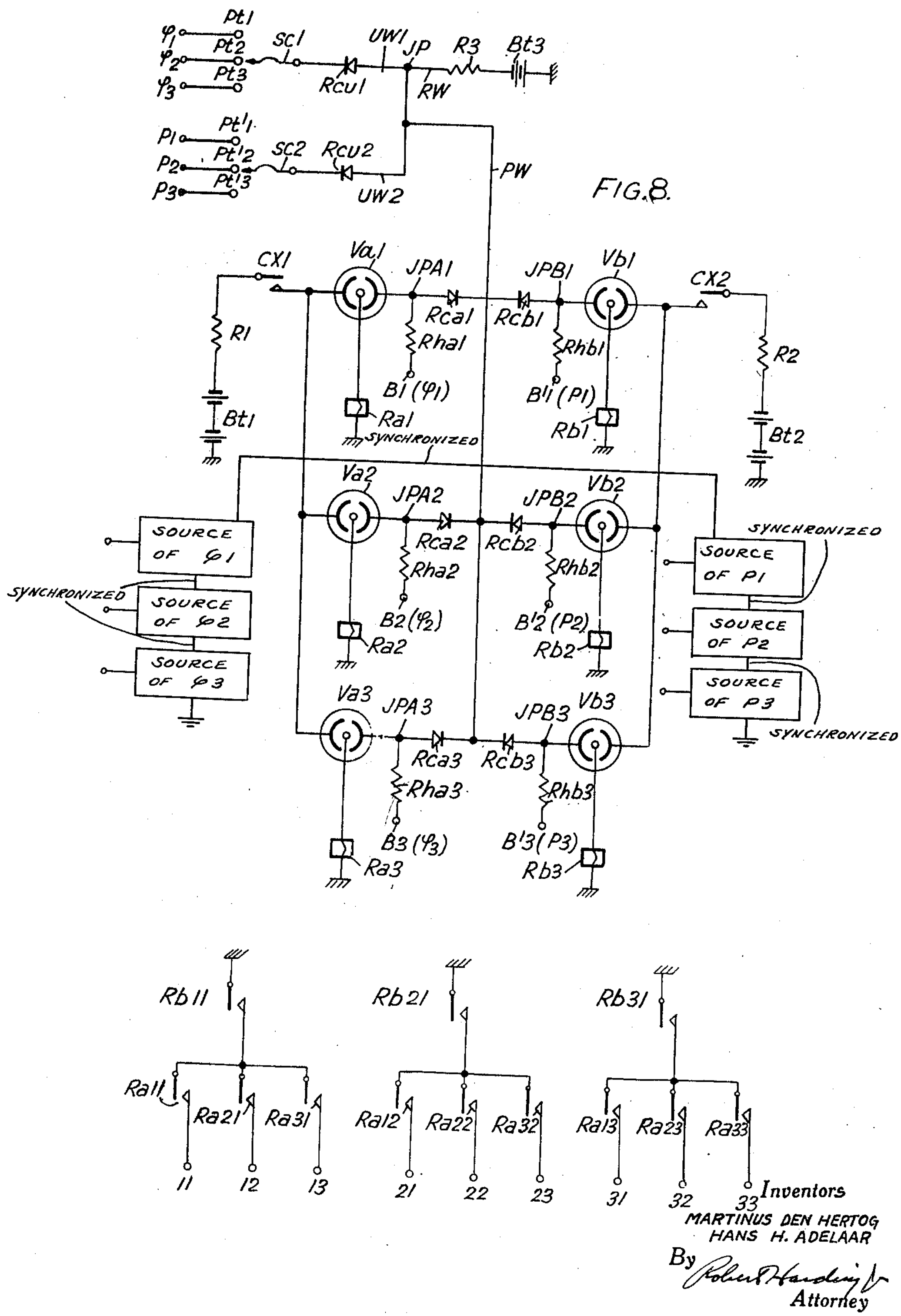
Fig. 8 shows a selection system comprising two groups of cold cathode tubes constituting the switching devices.

In Fig. 8 an arrangement is shown whereby a combination of control signals may be produced.

The selection system employs two cycles of periodic potential impulses similar to those shown in Fig. 4. The impulses of the second cycle can, for example, be employed to characterize groups of lines or equipments and the impulses of the first cycle can, for example, be employed to characterize the lines or equipments in each of the groups.

The comparator of Fig. 8 comprises two groups of cold cathode tubes Va1, Va2, Va3 and Vb1, Vb2, Vb3, the cathodes of the first group being on the left and the cathodes of the second group being on the right. The cathodes of the tubes Va1 to Va3 are connected in parallel through the contact cx1 and the resistance R1 to a battery Bt1 which is assumed to be at —150 v. and the cathodes of the tubes Vb1 to Vb3 are connected in parallel through the contact cx2 and a resistance R2, to a battery Bt2 assumed to be at —150 v. The anode of each of the tubes is connected to earth potential through the winding of a relay Ra or Rb.

The contacts Ra11 . . . 13, Ra21 . . . 23, Ra31 . . . 33, Rb11, Rb21 and Rb31 are respectively associated with the relays Ra1, Ra2, Ra3, Rb1, Rb2 and Rb3.

The control electrode of each of the tubes is connected through a unidirectional current carrying device, such as a rectifier Rca or Rcb, to a common control wire PW, all the rectifiers having the same orientation with respect to said wire PW, and also through a resistance Rha or Rhb to a terminal B, or B′, on which are received the potential impulses peculiar to each of the electrical switching devices. The connection of the control electrode to the resistance is made between said electrode and the rectifier. The terminals B1, B2 and B3 are respectively connected to the impulse sources φ1, φ2 and φ3 and the terminals B′1, B′2 and B′3 to the sources of impulses P1, P2 and P3.

Three secondary wires RW, UW1, UW2 are connected to the common control wire PW, similarly to the arrangement of Fig. 3. The wire RW is connected via a resistance R3, to a battery Bt3 which is assumed to be —50 v. The wire UW1 is connected through a rectifier RCU1 to a switch sc1 which may be placed on one of the contacts Pt1, Pt2, Pt3, respectively connected to the impulse sources φ1, φ2 and φ3; the wire UW2 is connected through the rectifier RCU2, to a switch sc2, which may be placed on one of the contacts Pt′1, Pt′2, Pt′3, respectively connected to the sources of impulses P1, P2 and P3.

The general rule for the arrangements of circuits associated with the input of the common control wire PW is to connect to said wire a source of potential via a resistance and the different sources of potential impulses via a rectifier. The current source connected via the resistance constitutes the source supplying the current for the transmission of the signal on the common control wire, the other sources connected through rectifiers never supplying current but absorbing the current of the source associated with the resistance for certain conditions of potential. It will be seen that, under these conditions, if one or other of the wires UW1 or UW2 is applied to a potential of —100 v., the potential of the point JP being higher than that of the contact on which the switch *sc*1 or *sc*2 is placed, the rectifier RCU1 or RCU2 is conductive and current flows from battery B*t*3 to one of the sources φ or P. This flow of current produces a drop of potential in the resistance R3, the value of which is such that potential of the point JP is maintained at —100 v. Thus a signal at —50 v. will only be sent on the wire PW if a potential of —50 v. is simultaneously applied to the switches *sc*1 and *sc*2. In all other cases the potential of the wire PW is maintained at —100 v.

As has been indicated the various cold cathode tubes are connected individually to a particular source of impulses. The three tubes of each of the groups are only capable of operating each in a different time unit, as is clear from Fig. 4. In the example shown, the tube V*a*1 can only be fired when the source of current transmits an impulse of —50 v. potential through B1 and when simultaneously an impulse of —50 v. is received on the wire PW. In effect, in the case in which a —50 v. impulse is received on the terminal B1 and at the same moment the wire PW is at the potential of —100 v., the potential of the point JPA1 being higher than that of wire PW the rectifier R*ca*1 is conductive and current flows from B1 to PW causing a drop of potential of 50 v. in the resistance R*ha*1 which has the effect of maintaining the potential of point JPA1 and consequently that of the control electrode of V*a*1 at —100 v., an insufficient potential value to cause its ionization. In the case in which the potential of terminal B1 is —100 v. and that of the wire PW —50 v., said wire being at a higher potential than that of the point JPA1, the rectifier R*ca*1 is not conductive and said point JPA1 is maintained at the potential —100 v.

If a —50 v. impulse is simultaneously received on the terminal B1 and the wire PW, the potential of the point JPA1 and consequently of the control electrode of V*a*1 is also —50 v.; if the contact *cx*1 is closed, the cathode of V*a*1 being at the potential —150 v., the difference of potential between said cathode and the control electrode is 100 v. which causes the ionization of the tube and its firing. Relay R*a*1 is then actuated.

We will now explain the operation of the selection comparator. It will be assumed that the switch *sc*1 has been placed on the contact P*t*2 and the switch *sc*2 on the contact P*t'*2. Under these conditions the wire PW will be at the potential of —100 v., except during the moment in which an impulse of potential φ2 and P2 is received simultaneously on contacts P*t*2 and P*t'*2. From the explanations given as to the operation of the tubes it is clear that in this particular case only the tubes V*a*2 and V*b*2 will be ionized and fired. The circuit of relay R*a*2 is then completed through: earth, relay R*a*2, anode and cathode of V*a*2, contact *cx*1 closed, resistance R1, battery B*t*1, earth, and that of relay R*b*2 through: earth, relay R*b*2, anode and cathode of V*b*2, contact *cx*2 closed, resistance R2 battery B*t*2 and earth. Relays R*a*2 and R*b*2 are energized and are held attracted when the impulses φ2 and P2 are no longer received. The flow of current in the resistances R1 and R2 causes a drop of potential and the potential of the cathodes of the tubes is restored to such a value that the tubes V*a*1, V*a*3, V*b*1 and V*b*3 can no longer operate but the tubes V*a*2 and V*b*2 are maintained fired.

Through their contact R*a*22 and R*b*21 relays R*a*2 and R*b*2 close the signalling or control circuit 22. It will be seen that the reception of predetermined impulses in the comparator device has made it possible to select by the operation of two tubes a particular wire among the nine signal or control wires emerging from said comparator.

In the comparator the position of the rectifier and of the resistance associated with each of the tubes might be reversed, that is to say, for example, for tube V*a*1, the rectifier placed between terminal B1 and common point JPA1 and the resistance between common point JPA1 and the wire PW. As stated in connection with the other figures, the rectifier must be connected to the circuit on which there can be no current cut off when the comparator is in service.

It is obvious that the number of tubes of each group depend on the number of impulses φ and P employed for the selection; if ten sources of impulses φ and ten sources of impulses P were employed in this case, for the comparator, we should have ten tubes in each group and the number of different signals received in said comparator and among which selection would be made would be 10×10=100.

It will be noted that it would be possible to employ other series of impulses for the selection, a third series Q for example, each of the impulses Q situated in time being in synchronism with a cycle of different impulses P and of equal duration to that of this cycle. In this case a third switch *sc*3 would be provided connected to the common point JP by a secondary wire UW3 through a rectifier RCU3. The switch *sc*3 can be placed on different contact on which the impulses Q would be received. A signal would only be sent on the wire PW when an impulse was received simultaneously on switches *sc*1, *sc*2 and *sc*3.

In the comparator a third group of tubes Vc would be provided connected to the wire PW in a similar manner to the group V*a* and V*b*, the control electrode of each said tubes Vc being connected to a particular source of impulses Q.

If three sources of impulses φ, P and Q were provided, a particular signal among the 27 possible signals would cause the operation of one tube of each of the groups and, through the set of contacts of the relays inserted in the anode circuit of each tube, the selection of a particular control or signalling circuit among an assembly of 27 circuits. If the cycles of impulses and the groups of tubes are provided on a decimal basis, a comparator of 30 tubes makes it possible to proceed with selection among a 1000 possible selections.

It is obvious that the capacity of this selection system is unlimited and may be increased by adding other impulses or series of impulses and the corresponding tubes or groups of tubes in the comparator.

Moreover, the number of tubes of each of the groups, that is to say, the impulses in each of the cycles of impulses might be different. There might be groups of *m, n, o* . . . tubes which give a total possible number of selections of *m*×*n*×*o* . . .

What is claimed is:

1. An electric selective system comprising a channel, a first input circuit, a resistance connected between said first input circuit and said channel, a second input circuit connected to said channel, means for intermittently applying a first potential to said first input circuit, a uni-directional current-carrying means in said second input circuit, means for normally applying a second potential lower than said first potential to said uni-directional current-carrying means and for replacing said second potential by a potential at least as high as said first potential in a series of impulses spaced in a time cycle, the frequency of said impulses being such that at predetermined intervals said potential at least as high as said first potential will be applied to said uni-directional current-carrying means simultaneously with the application of said first potential to said resistance, said uni-directional current-carrying means being poled so as to permit current to flow through said resistance only in a direction in which the voltage drop through said resistance will alter the voltage on said channel in a predetermined direction.

2. An electric selective system comprising a channel, a first input circuit, a resistance connected between said first input circuit and said channel, a plurality of second input circuits, a uni-directional current-carrying means in each of said second input circuits, means for applying a first potential intermittently to said resistance, and means for normally applying a second potential lower than said first potential to each uni-directional current-carrying means and for replacing said second potential with a potential at least as high as said first potential in a series of impulses spaced in a time cycle, the repetition arrangement of said impulses being fixed for each uni-directional current-carrying means but different as between some or all of said second input circuits, said uni-directional current-carrying means in each second input circuit being poled so as to permit current to flow through said resistance only in a direction in which the voltage drop through said resistance will alter the voltage on said channel in a predetermined direction.

3. An electric selective system, as defined in claim 2, in which the means for applying potential to the channel via the resistance comprises means for normally applying the second potential and for replacing said second potential with a potential at least as high as the first potential in a series of impulses spaced in a time cycle, the repetition arrangement of which is fixed and is the same as that of one of the impulse cycles applied to the undirectional current-carrying means.

4. An electric selective system comprising a channel, a first input circuit, a resistance connected between said first input circuit and said channel, a plurality of second input circuits connected to said channel, a uni-directional current-carrying means in each of said second circuits, means for applying a first potential intermittently to said resistance, means for normally applying a second potential lower than said first potential to each uni-directional current carrying means and for replacing said second potential with a potential at least as high as said first potential in a series of impulses spaced in a time cycle, the repetition arrangement of said impulses being fixed for each uni-directional current-carrying means but different as between some or all of said second input circuits, and means for varying the time position of the impulses in one of said impulse cycles, said uni-directional current-carrying means being poled so as to permit current to flow through said resistance only in a direction in which the voltage drop through said resistance will alter the voltage on said channel in a predetermined direction.

5. An electric selective system, as defined in claim 4, in which the cycle periods of the impulse applying means constitute a plurality of different orders in the same system of notation.

6. An electric selective system comprising a plurality of channels, a first input circuit for each channel, a resistance connected between said first input circuit and the associated channel, at least one second input circuit connected to each channel, a uni-directional current-carrying means connected in each second input circuit, means for applying to each resistance one of a plurality of trains of impulses having a predetermined repetition frequency, the impulses of each train being positioned in time from the impulses of every other train, and means for connecting all of the uni-directional current-carrying devices together and for selectively applying any one of said trains of impulses thereto, whereby said train of impulses will appear on the channel having the same train of impulses applied to it via its resistance, said uni-directional current-carrying means being so poled as to permit current to flow through the resistance connected to the associated channel only in a direction in which the voltage drop through said resistance will alter the voltage on said channel in a predetermined direction.

7. An electric selective system, as defined in claim 6, further comprising a plurality of two-position devices, one connected to each channel, adapted to be operated by the impulses thereon.

8. An electric selective system, as defined in claim 7, in which the two-position devices are gaseous discharge tubes each having a control electrode connected to the channel.

9. An electric selective system, as defined in claim 8, further comprising a common energizing circuit for the tubes, the cathodes of all said tubes being connected to said circuit, a resistance in said circuit of such a value that the discharge current of one tube will produce a voltage drop across said resistance sufficient to prevent any other tube from discharging.

10. An electric selective system, as defined in claim 9, in which each tube has its own individual anode circuit and a plurality of signal responsive devices are provided, one in the anode circuit of each of the tubes.

11. An electric selective system comprising a plurality of two-position devices arranged in a plurality of groups, a plurality of resistances, one connected to each of said devices, a plurality of rectifiers, a pair of said rectifiers being connected to each of said two-position devices and being so poled that current can flow through a resistance and its associated rectifiers only in a direction which will cause a drop in potential at the associated two-position device, a first group of sources of impulse trains having the same repetition frequency but having the impulses of each train spaced in time from those of all the other trains, a second group of sources of impulse trains having the same repetition frequency as between the impulse trains of the second group, the repetition frequency of one group being a multiple of that of the other group, means for applying different impulse trains of the first group respectively to corresponding resistances in the groups of two-position devices, means for applying different impulse trains of the second group respectively to a first rectifier in each group of two-position devices, and means for selectively applying one of the impulse trains of said second group to a second rectifier in each group of two-position devices, the impulses of all the trains having a value just sufficient to operate said two-position devices.

12. An electric selective system, as defined in claim 11, in which the two-position devices are gaseous discharge tubes having control electrodes connected to the resistances and rectifiers and having a common operating circuit, and a resistance is provided in said common circuit having a value such that if one tube operates the voltage drop across said resistance will be sufficient to prevent any other tube from operating.

13. An electric selective system, as defined in claim 12, in which each discharge tube is provided with switch means in its anode circuit for preventing the operation thereof.

14. An electric selective system, as defined in claim 13, further comprising a third rectifier connected to the control electrode of each tube, and means for selectively applying one of the trains of impulses from the first group of impulse sources to all said third rectifiers.

15. An electric selective system comprising a plurality of two-position devices arranged in groups, a plurality of resistances connected respectively to said devices, a plurality of rectifiers connected respectively to said devices in parallel with said resistances, said rectifiers being so poled that current can flow in the circuit of a resistance and its associated rectifier only in a direction which will produce a potential drop at the associated device, a plurality of groups of sources of impulse trains, the impulse trains of each group having the same repetition frequency but having the impulses of each train spaced in time from those of every other train of that group, the repetition frequencies of the trains of the different groups being different, means for applying the impulse trains of each group to the respective resistances associated with a different group of two-position devices, a common wire, means for connecting all of said rectifiers to said common wire, and means for selectively applying one of said impulse trains to said wire.

16. An electric selective system, as defined in claim 15, in which additional means is provided for selectively applying other of the impulse trains to the common wire.

17. An electric selective system, as defined in claim 16, in which the two-position devices are gaseous discharge tubes each having a control electrode connected to the associated resistance and rectifier and each having a cathode and an anode, said system further comprising a separate common connection for the cathode of each group, a resistance in each common connection of sufficient value to cause a voltage drop in said common connection when one of said tubes operates which will prevent other tubes in the group from operating, and a separate load device in the anode circuit of each tube.

18. An electric selective system, as defined in claim 17, in which the load devices are relays having contacts arranged in tree formation and a plurality of wires are provided connected thereto, so that the operation of combinations of the tubes will select a particular wire through said contacts.

MARTINUS DEN HERTOG.
HANS HELMUT ADELAAR.

REFERENCES CITED

The following references are of record in the file of this patent:

UNITED STATES PATENTS

| Number | Name | Date |
|---|---|---|
| 2,338,242 | Haigh | Jan. 4, 1944 |

OTHER REFERENCES

Proceedings of the I. R. E., February 1949, pages 139–147.